Jan. 3, 1967 W. ECKERT 3,296,430
TREE LIGHTING SYSTEM
Filed Oct. 1, 1964 2 Sheets-Sheet 1

William Eckert
INVENTOR.

Jan. 3, 1967  W. ECKERT  3,296,430
TREE LIGHTING SYSTEM
Filed Oct. 1, 1964  2 Sheets-Sheet 2
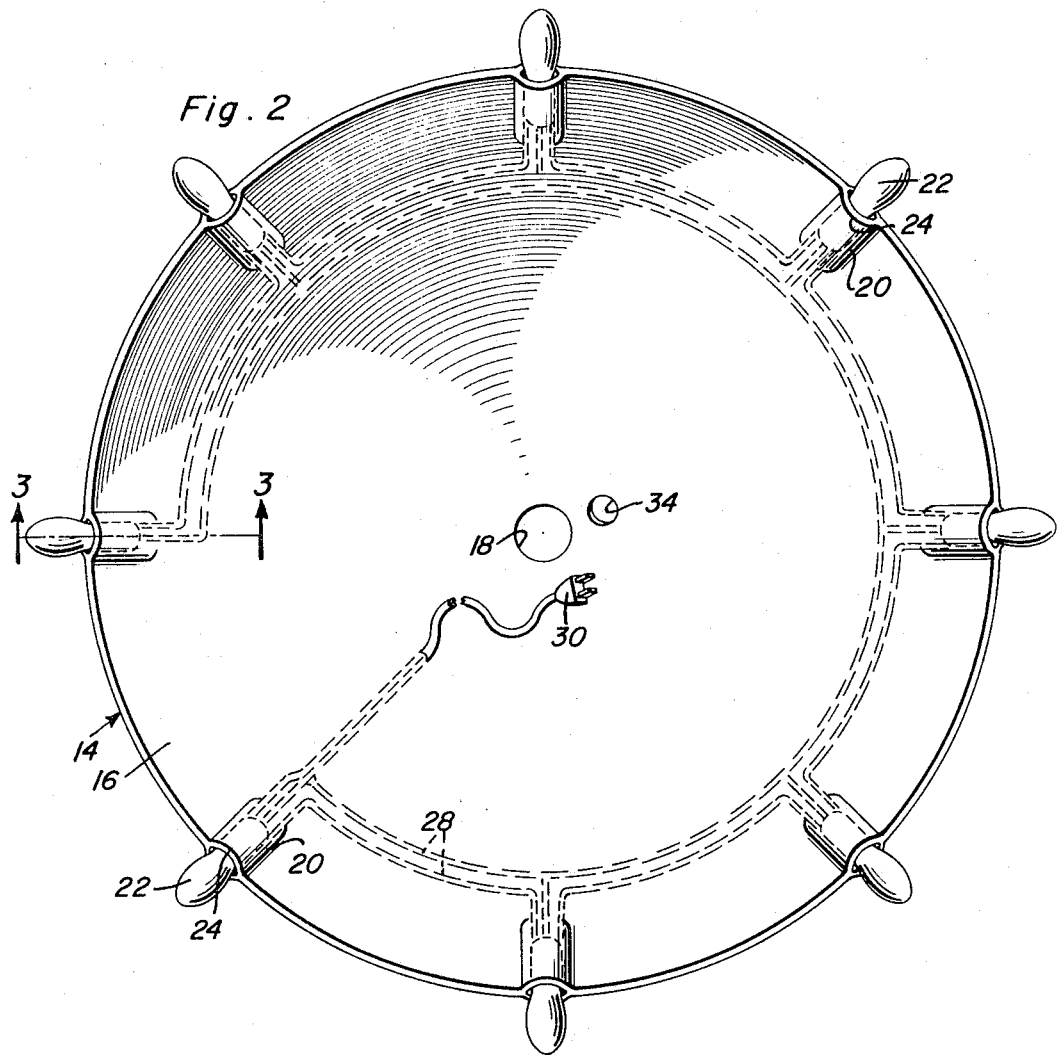
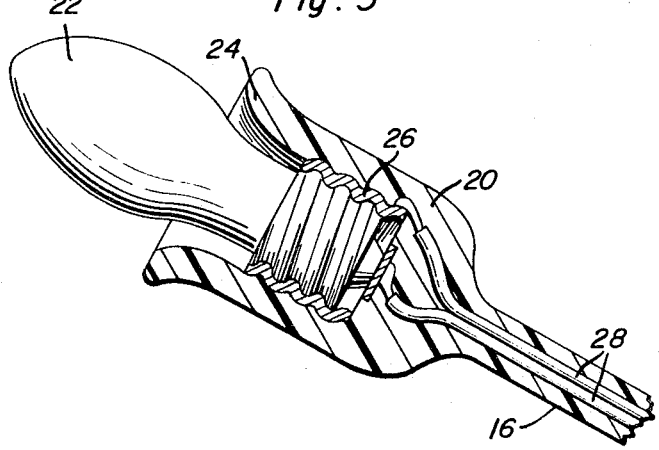
William Eckert
INVENTOR.

United States Patent Office 3,296,430
Patented Jan. 3, 1967

3,296,430
TREE LIGHTING SYSTEM
William Eckert, Bradenton, Fla.
(234 Logan St., Apt. 204, Denver, Colo. 80203)
Filed Oct. 1, 1964, Ser. No. 400,729
10 Claims. (Cl. 240—10)

This invention generally relates to new and useful improvements in artificial Christmas trees particularly although not necessarily, of the knock down type and has for its primary object to provide, in a manner as hereinafter set forth, novel lighting or illuminating means for such trees.

Another highly important object of the present invention is to provide an improved illuminating or lighting means of the character described which may readily be mounted for use on existing artificial trees.

Still another important object of the present invention is to provide a lighting system of the aforementioned character which is adaptable to trees of various sizes.

Still another object of the invention is to provide, in a tree lighting system of the character set forth comprising a multiplicity of incandescent lamps of various colors, a unique construction and arrangement whereby said lamps may be expeditiously replaced when necessary.

Other objects are to provide an artificial tree lighting system which is comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of one of the fixtures; and

FIGURE 3 is a vertical sectional view on an enlarged scale through one of the lamp assemblies, taken substantially on the line 3—3 of FIGURE 2.

Figure 1:
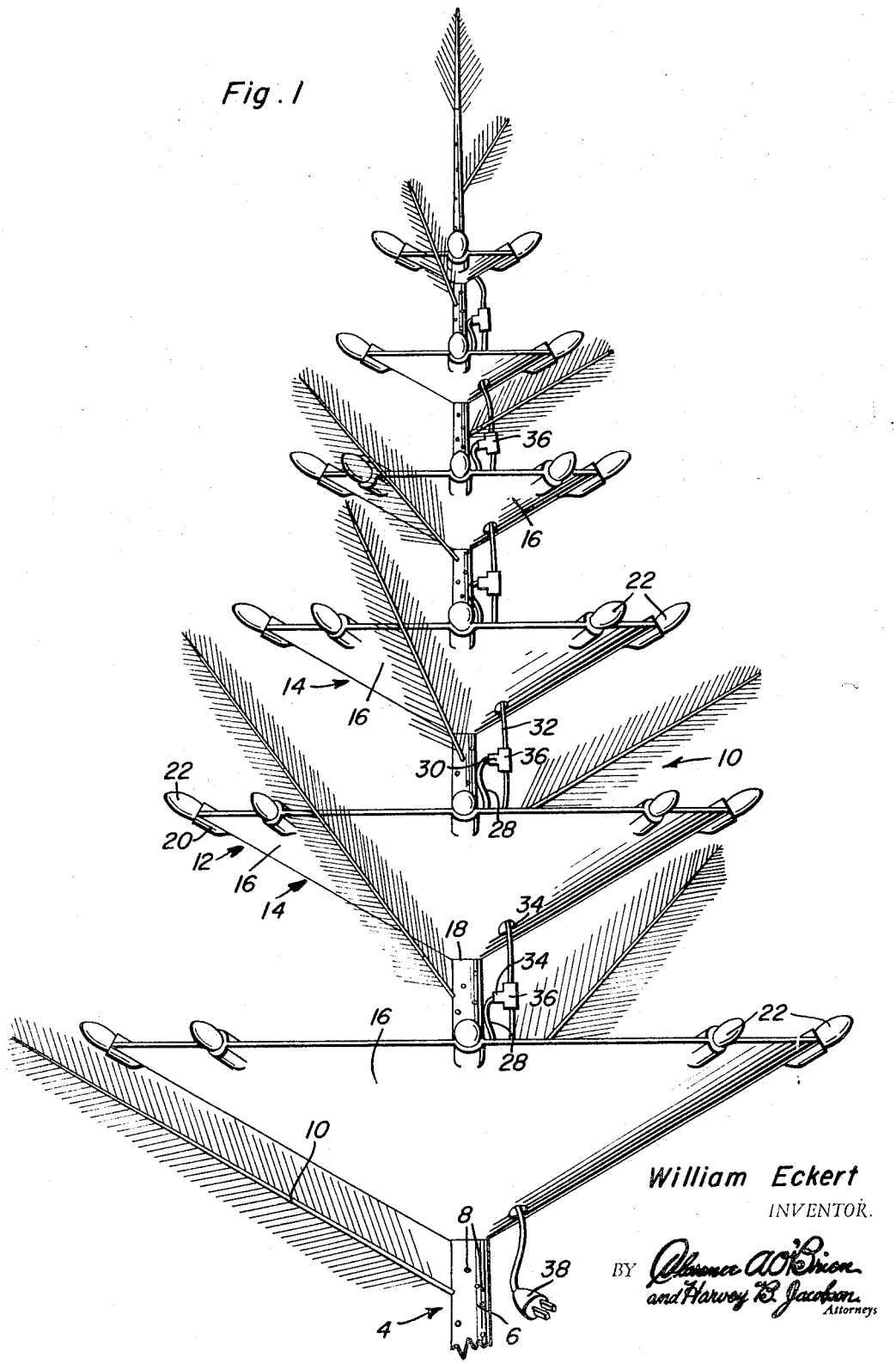
FIGURE 1 is an elevational view of an artificial Christmas tree provided with a lighting system in accordance with the present invention.

Referring now to the drawings in detail, it will be seen that reference numeral 4 generally designates an artificial Christmas tree of suitable dimensions. The artificial tree 4 includes a tapered trunk 6 of suitable dimensions and material having therein a multiplicity of inwardly and downwardly inclined bores or sockets 8. The sockets 8 are for the reception of the inner end portions of removable, outwardly and upwardly inclined branches or limbs 10.

Removably mounted on the tree 4 is a lighting system or apparatus which is generally designated by reference numeral 12. The lighting apparatus 12 includes a series of vertically spaced fixtures or units 14. Each fixture 14 comprises an inverted conical bracket or member 16 of a suitable transparent plastic or other material. The inverted conical bracket 16 has formed centrally therein a circular opening 18 which receives therethrough the trunk 6 of the tree 4. It will be observed that the inverted conical brackets 16 successively decrease in diameter from the lowermost to the uppermost of said brackets. Also, the openings 18 are of a diameter to seat at spaced points on the tapered tree trunk 6 for vertically spacing the fixtures 14. The construction and arrangement is such as to facilitate rotary and vertical adjustment of the fixtures 14.

Outwardly opening sockets 20 are formed integrally with the peripheral portion of the inverted conical bracket 16. Any suitable number of such sockets may be provided on each fixture. The sockets 20 are for the reception of incandescent lamps 22 of various colors. As shown to advantage in FIGURE 3 of the drawings, the sockets 20 include on their open ends flared axial shields or guards 24 which prevent the branches 10 from contacting the metallic elements 26 of the sockets in addition to facilitating insertion of the lamps 22.

Conductor wires 28 electrically connect the sockets 20 in parallel. It will be noted that the conductor wires 28 are embedded or molded in the inverted conical bracket or member 16. To facilitate production, plastic bracket 16 may comprise plies or laminations which receive the conductor wires 28 therebetween. As best seen in FIGURE 2 of the drawing, the conductor wires 28 emerge at one end from the plastic bracket 16 and said wires are provided with male electric plugs 30 of the prong type.

In the embodiment shown, a conductor cord 32 electrically connects the fixtures 14. Toward this end, the inner portions of the brackets 16 are provided with openings 34 through which the connector cord 32 passes. The conductor cord 32 has interposed therein female receptacles 36 which receive the plugs 30. The lower end of the conductor cord 32 is provided with a male plug 38.

It is though that the operation or use of the invention will be readily apparent from a consideration of the foregoing. Briefly, the inverted conical brackets 16 of the fixtures 14 are seated at vertically spaced points on the tapered tree trunk 6 and electrically connected by inserting the plugs 30 in the receptacles 36, after which the limbs or branches 10 may be inserted in the usual manner in the sockets 8. As shown, the inverted conical brackets 16 substantially parallel the branches 10 and thus do not interfere with said branches. As hereinbefore set forth, the flared shields 24 prevent the branches 10 from contacting the metallic portions of the socket assemblies, the general construction and arrangement of parts being such as to insure maximum safety from fire. Further, the transparent plastic conical brackets 16 transmit light from the variously colored lamps 22 for a highly pleasing effect.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An artificial tree having an upstanding trunk, a plurality of generally disc-shaped brackets mounted on the trunk at points spaced vertically therealong with said trunk passing centrally therethrough, a plurality of incandescent lamps spaced circumferentially about the peripheral portions of the brackets, and means electrically connecting said lamps and adapted for electrical connection to a suitable source of electrical potential, said brackets being of substantially inverted shallow conical shape and progressively downwardly increasing in diameter.

2. A lighting apparatus for artificial trees having a trunk, said apparatus comprising a plurality of fixtures including circular brackets mounted on the trunk with said trunk passing centrally therethrough, generally radial outwardly-opening sockets on the peripheral portion of the brackets, incandescent lamps in the sockets, and means electrically connecting the sockets, said brackets being of substantially inverted conical shape, said brackets further being transparent for the passage of light from the lamps.

3. The combination of claim 2, said means including a conductor cord extending between fixtures, and conductor wires embedded in the brackets and connecting the lamps thereon in parallel.

4. The combination of claim 3, said conductor wires including an exposed end portion and an electric plug thereon, said conductor cord including spaced receptacles for receiving the plugs.

5. The combination of claim 4, said brackets having central openings therein receiving the trunk and further having additional openings therein receiving the conductor cord therethrough.

6. An artificial tree comprising a tapered trunk, fixtures comprising vertcially spaced brackets mounted on the trunk, said brackets having openings therein receiving the trunk therethrough, said openings progressively upwardly decreasing in size and said brackets being slidable down said trunk for seating thereon at points spaced vertically therealong, electric sockets on the brackets, and means electrically connecting the sockets and a plurality of generally radially outwardly projecting elongated limbs removably secured to said trunk and spaced circumferentially thereabout and vertically therealong, said branches being upwardly and outwardly inclined relative to the trunk, said brackets being conical and substantially paralleling the branches.

7. An artificial tree comprising a tapered trunk, fixtures comprising vertically spaced brackets mounted on the trunk, said brackets having openings therein receiving the trunk therethrough, said openings progressively upwardly decreasing in size for seating the brackets on the tapered trunk at spaced points, electric sockets on the brackets, and means electrically connecting the sockets, inclined branches on the trunk, said brackets being conical and substantially paralleling the branches, said brackets being transparent for the passage of light from the lamps.

8. The combination of claim 1 including a plurality of generally radially outwardly projecting elongated limbs carried by and spaced circumferentially about said trunk between each pair of vertically spaced brackets and projecting radially outwardly of at least the outer peripheral portions of the bracket disposed immediately thereabove.

9. The combination of claim 1 wherein said brackets are transparent for the passage of light from lamps therethrough.

10. An artificial tree comprising a tapered trunk, fixtures comprising vertically spaced brackets mounted on the trunk, said brackets being disc-shaped in plan, at least semi-rigid, and having openings therein receiving the trunk therethrough, said openings progressively upwardly decreasing in size and said brackets being slidable down said trunk for seating thereon at points spaced vertically therealong, said brackets progressively upwardly decreasing in diameter, electric illumination means carried by each of said brackets in fixed predetermined positions thereon and spaced radially outwardly of and circumferentially about said trunk, and means electrically connecting said electric illuminating means and adapted for electrical connection to a suitable source of electrical potential, said brackets being transparent for the passage of light from said illuminating means.

References Cited by the Examiner

UNITED STATES PATENTS

| 1,744,383 | 1/1930 | Hessel | 240—10 X |
| 2,453,695 | 11/1948 | Belling | 240—10 |
| 2,558,029 | 6/1951 | Wood | 240—10 |
| 2,605,389 | 7/1952 | Kimball | 241—81 |
| 2,922,031 | 1/1960 | Stiffel | 240—81 |
| 2,957,978 | 10/1960 | Soprani | 240—10 |
| 3,003,056 | 10/1961 | Resch | 240—10 |
| 3,009,009 | 11/1961 | Holbrook | 240—10 X |
| 3,019,357 | 1/1962 | Zaffina | 240—10 X |
| 3,163,573 | 12/1964 | Brooks | 161—24 |

FOREIGN PATENTS 290,341    2/1916    Germany.

NORTON ANSHER, *Primary Examiner.*